Patented July 23, 1935

2,009,118

UNITED STATES PATENT OFFICE 2,009,118

TREATMENT OF MOTOR FUEL

Jacque C. Morrell, Chicago, Ill., assignor to Universal Oil Products Company, Chicago, Ill., a corporation of Delaware No Drawing. Application February 27, 1933,
Serial No. 658,812

2 Claims. (Cl. 44—9)

This invention relates more particularly to the treatment of cracked distillates of gasoline boiling range or those containing a substantial proportion of gasoline, such distillates being generally characterized by a relatively high knock rating.

More specifically the invention has reference to processes of treatment whereby the deterioration of such fuels on storage with respect to gum formation and particularly anti-knock value is substantially prevented, under the varying influence of light, air, etc., to which they are subjected.

The development of the cracking process has introduced new problems to the petroleum refining industry since the gasolines produced contain unstable hydrocarbons of the nature of di- and tri-olefins which have a tendency to polymerize and form gums and since they contain also a percentage of sulphur compounds depending upon the sulphur content of the oil cracked and the conditions of operation. To produce cracked gasolines equivalent to the straight run or natural variety in respect to color, color stability, odor, low sulphur content, etc., recourse is usually had to regulated sulphuric acid treatment followed by neutralizing and sweetening and redistillation to produce a gasoline of desired end point. However, sulphuric acid treatment and other more or less equivalent treatments are not entirely selective and in many cases remove the relatively stable mono-olefins as well as the unstable and easily polymerizable di- and tri-olefins so that treating losses are high and considerable loss in anti-knock value results due to the removal of the olefinic compounds.

It has recently been discovered that the deterioration in cracked gasolines on storage can be prevented or at least considerably retarded by the use of very small amounts of certain types of compounds (principally organic) which have been given the general name of inhibitors. These substances are readily oxidizable so that they apparently preferentially absorb oxygen to which the gasolines may be exposed and thus prevent the polymerization reactions which apparently depend upon the action of both light and oxygen. While inhibitors do not act for an indefinite time, they can be selected and utilized in such quantities so that gasolines may be stored without deterioration for reasonable periods prior to their consumption.

A large number of individual chemical compounds and mixtures as well as some more or less crude or unrefined products are available for use in inhibiting the development of undesirable properties due to the oxidation and polymerization of cracked gasolines. Certain hydroxy compounds are of outstanding value such as cresols, alpha naphthol, guaiacol and di- and tri-hydroxy benzene derivatives which include such compounds as pyrocatechol and pyrogallol. The ethers of phenols are also utilizable; also certain amino derivatives. Among the more or less crude raw materials which may be employed may be mentioned certain fractions of coal tars, wood tars, etc. The foregoing are mentioned as possibilities for use in preventing the deterioration of the overhead fractions though the use of other compounds is comprised which are not specifically enumerated.

In one specific embodiment the present invention comprises the treatment of stabilized cracked distillate of approximate motor fuel boiling range with inhibitors.

The term "stabilized" as used in the present instance refers to a gasoline from which a sufficient amount of the lower boiling volatile compounds have been removed by fractionation so that its vapor pressure is reduced to permissible limits and it undergoes substantially no loss of light ends or "weathering" under storage conditions.

I have found that, in so treating cracked gasolines for the removal of these volatile constituents, certain types of compounds are lost which are not only difficult to preserve in themselves but also adversely affect the action of inhibitors so that prohibitively large amounts must be used to overcome their influence. The exact character of these substances is difficult of determination owing to their unstable chemical character, their easy oxidizability and their presence in extremely small quantities. It is possible that low boiling dienes such as butadiene and other low boiling olefins of the same highly unsaturated character may be the cause of the difficulty but in any event the improvement in ease of preservation of properties by inhibitors when such compounds are removed by stabilization steps is a frequent if not invariable rule. Experiments have shown in some instances that such di- and tri-olefinic compounds readily form peroxides which instigate a series of chain reactions resulting finally in the polymerization of the more highly unsaturated olefins with the accompanying development of gums and tarry polymers. Since the action of inhibitors apparently depends upon their preferential absorption of oxygen so that such chain reactions are retarded, it is understandable that compounds may be present in cracked gasoline which have a greater affinity for oxygen than the inhibitor and which therefore tend to negative its action.

It is generally preferable to add inhibitors to cracked gasolines which have been stabilized in respect to volatile constituents soon after their production and before their exposure to light or air or any appreciable time of storage, since the reactions leading to the formation of the undesirable polymers sometimes starts as soon as the gasoline vapors are condensed, owing possibly to the presence of small quantities of oxygen or sulphur containing compounds. Gasolines in which polymerization reactions have already started are more difficult to preserve than the freshly prepared products.

The amount of any particular inhibiting material chosen which is necessary to preserve the properties of a stabilized cracked gasoline will depend upon the efficiency of the compound itself and upon the susceptibility to change of the gasoline which in turn is determined by the chemical character of its constituents. Therefore, the choice of any particular inhibitor and the amount which it is necessary to use will be determined by a number of factors such as the cost and availability of the materials, the exact character of the gasoline and the average period of time for which it is to be stored. It is conceivable that certain compounds or mixtures of compounds might be discovered which would inhibit separately the formation of gum, color or decrease in knock rating, although in most instances it has been found that the development of gums and color and loss in anti-knock value are closely related so that whatever inhibits one type of change also inhibits the other.

Inhibitors are to be distinguished from anti-knock agents in that the true anti-knock agent modifies the combustion of fuel in an internal combustion engine cylinder but does not necessarily prevent the development of undesirable characteristics under storage. In fact, numerous well-defined anti-knock agents are themselves unstable in storage and the gasoline to which they are added needs further additions of true inhibitors to stabilize the increased anti-knock value produced by the addition of the anti-knock agent. Furthermore, it is usually necessary to use much higher percentages of reagents to prevent knocking than are necessary in inhibiting deterioration and depreciation of the gasoline so that it will be seen that in the great majority of cases the action of anti-knock agents is distinct from that of true inhibitors the use of which is included in the process of the present invention.

As an example of the greater ease with which inhibitors act upon stabilized cracked gasolines than on unstabilized gasolines, the following case may be cited involving the treatment of the gasoline from a plant operating on a Pennsylvania fuel oil before and after stabilization. The inhibitor used may be tricresol, the commercial mixture produced as a by-product of coal distillation. To determine the efficacy of the inhibitor, use may be made of the oxygen bomb test which shows under standardized conditions of temperature and pressure the so-called "induction period" preceding a measurable rate of oxygen absorption for any gasoline under test, the higher induction period indicating the more stable gasoline. Ordinarily an induction period of 4 hours is considered to indicate sufficient stability for the average storage period in refineries.

Using the same amount of tricresol on the unstabilized and the stabilized gasoline, that is, 0.2% in each case, the induction period for the unstabilized product may be 120 minutes whereas the period may be raised to from 300 to 400 minutes by stabilizing the gasoline to a predetermined vapor pressure falling within different commercial requirements.

It is obvious from the foregoing description of the process and the example and the results obtainable by its use that it constitutes a distinct improvement in the art of using inhibitors. It is to be understood, however, that the descriptive portions of the specification and the illustrative data have not been given to unduly limit the generally broad scope of the invention since many other examples might be given than the single one presented.

I claim as my invention:

1. In the art of preventing or reducing deterioration of cracked gasoline during storage by the addition of inhibitors thereto, the improvement which comprises separating from the gasoline, by fractionation of the latter prior to the addition of the inhibitor thereto, those light ends of cracked gasoline which normally evaporate under atmospheric storage conditions and which have a greater affinity for oxygen and therefore adversely affect the action of the inhibitors, and then adding the inhibitor to the thus stabilized gasoline.

2. The improvement as defined in claim 1 further characterized in that the inhibitor is added to the gasoline immediately after the separation of said light ends.

JACQUE C. MORRELL.